July 3, 1962 R. H. BOSWORTH 3,042,740

MOUNTING BOARD FOR ELECTRIC CIRCUIT ELEMENTS

Filed Nov. 30, 1960

INVENTOR
R. H. BOSWORTH
BY Harry C. Hart
ATTORNEY

United States Patent Office 3,042,740
Patented July 3, 1962

3,042,740

MOUNTING BOARD FOR ELECTRIC CIRCUIT ELEMENTS

Raymond H. Bosworth, Watchung, N.J., assignor to Bell Telephone Laboratories, Incorporated, New York, N.Y., a corporation of New York Filed Nov. 30, 1960, Ser. No. 72,606
3 Claims. (Cl. 174—68.5)

This invention relates to mounting boards for circuit elements and particularly to a mounting board suitable for the mechanical support and electrical interconnection of minute circuit elements of the type of which modern high frequency circuits are built.

The principal object of the invention is to facilitate the construction of high frequency circuits composed of minute components with a minimum of special effort on the part of the circuit designer and to permit him to establish interconnections among such circuit elements with a high degree of freedom in their arrangement. A related object is to minimize undesired capacitance coupling among such elements and between any such elements and ground.

The mounting board of the invention accomplishes these objects. It comprises a rigid sheet or plate of insulating material bearing on one face a plurality of discrete unconnected spots of conducting material arranged in a two-dimensional array and, on the opposite face, a single connected layer of film of conducting material having a like plurality of apertures disposed in a similar array, each such aperture being as large as or slightly larger than the oppositely located conducting spot on the first face and substantially congruent with it. In addition, each of the conducting spots on the first face is pierced by a hole or channel that extends through the entire thickness of the insulating plate to emerge on the second face in the center of the oppositely located aperture.

Each of the conducting spots serves as a connection point for a terminal of a minute circuit element. Such circuit elements, as usually fabricated, are provided with end terminal conductors in the form of flexible wires of the order of 10–50 mils in diameter. Accordingly, in constructing a circuit combination, this flexible wire can readily be inserted into the channel, which thereby provides mechanical support for it, whereupon a minute drop of solder suffices to establish electrical connection between the terminal wire and the conducting spot, and also to hold the wire in its channel and prevent it from accidentally slipping out.

It is of importance for successful operation of such very high frequency circuits that certain terminals of certain circuit elements be firmly connected to a conductor of fixed potential, commonly known as "ground," and that this ground connection be of the shortest possible length. It is also of importance that the capacitance of each circuit element to ground be as low as possible. By virtue of the congruence of each conducting spot with an aperture in the oppositely disposed conducting film, no part of any spot on one face of the plate is directly opposed to any part of the conducting film on the other face of the plate. Indeed, if the aperture is slightly larger than the spot, there is an underlap, in contrast to an overlap, between each spot and the nearest part of the film. This construction results in holding the capacitance between spot and film to the smallest possible value. By virtue of the fact that the conducting film covers all parts of the second face that are not opposed by conducting spots on the first face, the film constitutes an excellent equipotential ground conductor having no undesired paths in which circulating currents can flow.

The invention will be fully apprehended from the following detailed description of an illustrative embodiment thereof in which.

Figure 1:
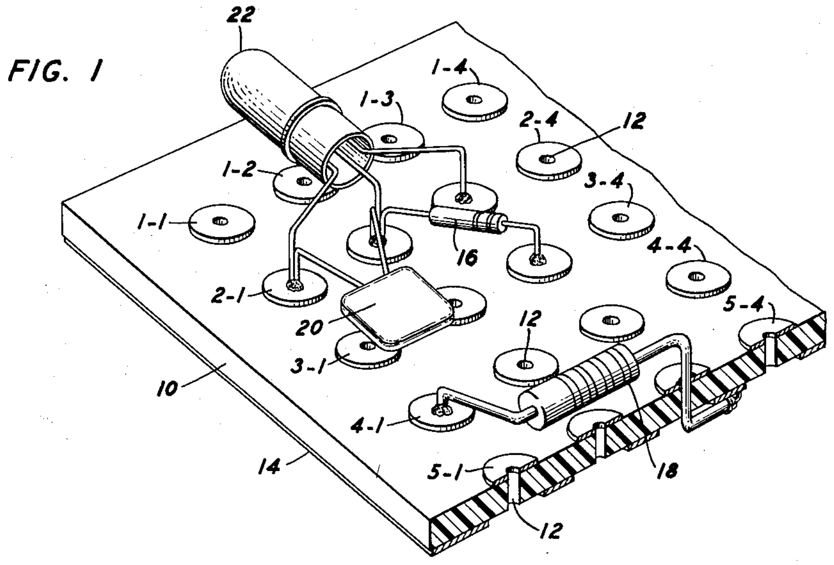
FIG. 1 is a perspective view, partly in section, of one face of a portion of the mounting board of the invention, with representative circuit elements mounted on it and interconnected.

Referring now to the drawings, FIG. 1 shows one corner of a mounting board comprising a rigid sheet 10 or plate of insulating material such as a synthetic resin, preferably stiffened and strengthened by incorporation therein of a fabric or fibers of an insulating material such as glass. The upper face of the plate 10 is provided with a plurality of discrete spots 1–1, 1–2 . . . 5–1 . . . 5–4, of a conducting film such as copper, arranged in a rectangular array. In order to permit illustration of the structure of the spots, only a single corner of the mounting board 10 is shown; i.e., a portion containing four columns of spots, each of four rows and, in addition, a row of half spots. In actuality, the number of rows and columns of spots may be much greater.

Each of the spots may conveniently be circular in form, and the diameter of each spot may advantageously be about one half of the center-to-center spacing of the spots. Thus with the spots on one quarter inch centers, the diameter of each spot may advantageously be one eighth inch.

Each spot is pierced by a channel 12 which extends through the insulating plate 10 from side to side thereof, preferably commencing in the center of the spot. The disposition of the channels 12 with respect to the spots is illustrated in the cases of the spots 5–1 through 5–4.

Figure 2:
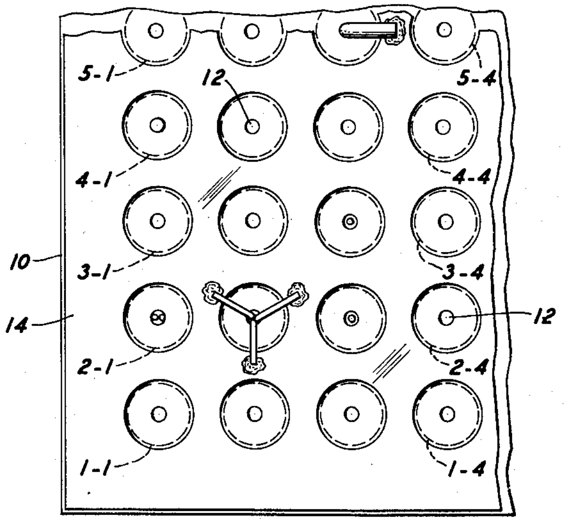
FIG. 2 is a plan view of the underside of the mounting board of FIG. 1.

FIG. 2 shows the underside of the mounting board. The second face of the plate 10 bears a conducting film 14 that is, in the terminology of topological science, a "connected" surface; i.e., a surface of a character such that a continuous path can be traced from any part of the film 14 to any other part without ever departing from the film; in some cases a straight path and in other cases a crooked path which, however, is never much greater in length than the shortest distance between the two parts.

While the film 14 is a "connected" surface, it is not a "simply connected" surface for the reason that it is pierced by a plurality of apertures arranged in a rectangular array similar to the array of spots. Each aperture is of the same shape and size as one of the conducting spots on the upper face, or slightly larger. Moreover, each of the apertures in the connected film is located so as to be substantially congruent with the oppositely located conducting spot, and is identified by the reference numeral designating the opposite spot. Thus, each of the channels 12 of FIG. 1 which starts in the center of a conducting spot terminates in the center of the oppositely located aperture in the conducting film 14.

This conducting film 14 serves advantageously as a ground conductor for such terminals of the circuit elements as require to be grounded. Because the apertures in the film 14 are at least as large as the spots and preferably somewhat larger, and because they are disposed congruently with the spots, no part of the conducting material of any spot is directly opposed to any part of the conducting film 14. To the contrary, there is preferably a slight underlap. This structure results in holding the capacitance between any spot and the film 14 to the smallest possible magnitude.

Figure 3:
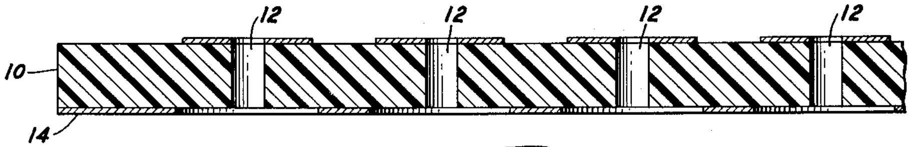
FIG. 3 is an enlarged cross sectional view of the mounting board of FIG. 1, viewed edgewise.

FIG. 3 shows the relative dispositions of insulating sheet 10, conducting spots 1–1 . . . 5–5, conducting film 14 and channels 12 to an enlarged scale.

When, as in the present illustration, the spots on the upper face of the mounting board are of circular shape and of diameters equal to their center-to-center spacing, the ratio of the area of the upper face that is covered by metal film to its total area is $\pi/16$, i.e., less than 20%. By the same token, when the apertures in the connected film 14 on the underside are of the same size as the spots on the working side, the area of the underside that is covered by metal film is more than 80% of the total area; and if the apertures are slightly larger than the spots, to provide an underlap, it is of the order of 65–75%.

Hence, this construction holds the metal-covered area of the working face of the board to the smallest possible value consistent with ease of manipulation and, at the same time, holds the metal-covered area of the underside of the board to the largest possible value consistent with prevention of overlap. A large area for the connected film 14 on the underside is of advantage for a ground conductor, especially at ultrahigh frequencies at which, because of the skin effect, its resistance is determined largely by its surface area, in contrast to its volume.

FIG. 1 shows two resistors 16, 18 each having two terminals, a condenser 20 having two terminals, and a transistor 22 having three terminals, all mounted on the upper or "working" face of the board. In the channel that pierces the first spot 2–1 of the second row, one terminal of the transistor 22 and a terminal of the condenser 20 have been inserted. Three electrodes, namely the second terminal of the condenser 20, the second terminal of the transistor 22 and a terminal of the resistor 16 have been inserted together in the channel that pierces the second spot 2–2 of the second row. The third transistor terminal has been inserted alone in the channel that pierces the third spot 2–3 of the second row. The channel that pierces the third spot 3–3 of the third row contains the second terminal of the resistor 16 and the first channel of the fourth row contains a first terminal of the resistor 18. The remaining terminal of the resistor 18 extends through the channel that pierces the third spot 5–3 of the fifth row, shown in section, and, after having been extended through the full length of the channel and beyond, has been bent through an angle and soldered to the nearest portion of the conducting film, thus to ground it. This ground connection is also shown in FIG. 2. As another illustration of a ground connection, the three electrodes which extend through the channel that pierces the second spot 2–2 of the second row are shown in FIG. 2 to have been similarly bent and soldered to the conducting film.

Inasmuch as the diameter of each aperture in the conducting film 14 is of the order of one eighth inch, the distance parallel with the underface of the plate, from any channel 12 to the nearest point of the conducting film 14, is of the order of one sixteenth inch. Hence, each ground connection is exceedingly short.

In the construction of a circuit combination on the mounting board each wire, terminal or electrode that is to be supported is first inserted in a suitably located channel 12 and then, preferably, is soldered to the spot on the upper face through which this channel extends in order to hold the wire firmly and secure it against being accidentally pulled out of its channel. When two wires, terminals, or electrodes are to be connected together, a single channel 12 serves as a convenient connection point for them, i.e., as in the case of the channel piercing the first spot 2–1 of the second row. If this connection is to be left ungrounded, the builder merely refrains from bending the wires after their passage through the channel. If, as in the case of the three wires that enter the channel piercing the second spot 2–2 of the second row, they are to be connected to ground, the builder need merely force them, or any one of them, through the channel and beyond its lower opening and thereupon bend them, or one of them, over until it makes contact with the ground film, whereupon a secure electrical connection can be established with a minute drop of solder.

On certain occasions, need arises for connecting a large number of wires together. For this purpose two or three spots on the upper face of the board can be interconnected with bridging wires. If the board is too crowded to permit this approach or if, for any reason, it is needful that the large number of wires be interconnected as nearly as possible at a single point, resort may be had to a peg having a shank that fits snugly into the channel and a head that bears firmly on the face of the conducting spot and bears, on the upper part of its head, a groove of a size convenient for the connection of all of the wires in question. The peg serves as a convenient binding post.

It will be evident that the mounting board of the invention provides great freedom to the circuit builder and permits him to assemble his circuit arrangement with rapidity while holding all undesired consequences of such rapid action to a minimum.

What is claimed is:

1. A mounting board for electric circuit elements which comprises a rigid plate of insulating material having two opposite parallel faces, a plurality of spots of conducting material fixed to one face of said plate and individually spaced apart in a two-dimensional array, a connected film of conducting material fixed to the opposite face of said plate and pierced by a like plurality of apertures, each aperture being substantially congruent with one of said spots, said plate being further pierced by a plurality of channels extending through said plate from one face to the other face, one open end of each channel being substantially centered in a spot, the other open end of each channel being substantially centered in an aperture.

2. A mounting board for electric circuit elements which comprises a rigid plate of insulating material having two opposite parallel faces, a plurality of spots of conducting material fixed to one face of said plate and individually spaced apart in a two-dimensional array, a connected film of conducting material fixed to the opposite face of said plate and pierced by a like plurality of apertures, each aperture being disposed immediately opposite to one of said spots, having the same shape as its opposite spot and slightly greater dimensions, said plate being further pierced by a plurality of channels extending through said plate from one face to the other face, each channel extending from a spot to the nearest aperture.

3. A mounting board for electric circuit elements which comprises a rigid plate of insulating material having two opposite parallel faces, a plurality of discrete circular spots of conducting material fixed to one face of said plate and arranged in a two-dimensional array, the diameter of each spot being substantially one half of the center-to-center spacing between spots, a connected film of conducting material fixed to the opposite face of said plate and pierced by a like plurality of apertures, each aperture being congruent with one of said spots, said plate being further pierced by a plurality of channels extending through said plate from one face to the other face, one open end of each channel being substantially centered in a spot, the other open end of each channel being substantially centered in an aperture.

No references cited.